(12) United States Patent
Du

(10) Patent No.: US 10,447,913 B2
(45) Date of Patent: Oct. 15, 2019

(54) FOCUSING METHODS AND APPARATUSES, AND PHOTOGRAPHING DEVICES

(71) Applicant: BEIJING ZHIGU RUI TUO TECH CO., LTD., Beijing (CN)

(72) Inventor: Lin Du, Beijing (CN)

(73) Assignee: Beijing Zhigu Rui Tuo Tech Co., Ltd., Beijing (CN)

( * ) Notice: Subject to any disclaimer, the term of this patent is extended or adjusted under 35 U.S.C. 154(b) by 16 days.

(21) Appl. No.: 15/559,189

(22) PCT Filed: Mar. 4, 2016

(86) PCT No.: PCT/CN2016/075562
§ 371 (c)(1),
(2) Date: Sep. 18, 2017

(87) PCT Pub. No.: WO2016/150290
PCT Pub. Date: Sep. 29, 2016

(65) Prior Publication Data
US 2018/0084186 A1 Mar. 22, 2018

(30) Foreign Application Priority Data
Mar. 24, 2015 (CN) .......................... 2015 1 0131892

(51) Int. Cl.
*H04N 5/232* (2006.01)
*G02B 7/38* (2006.01)
*H04N 5/369* (2011.01)

(52) U.S. Cl.
CPC .......... *H04N 5/23212* (2013.01); *G02B 7/38* (2013.01); *H04N 5/3696* (2013.01)

(58) Field of Classification Search
CPC ..... H04N 5/23212; H04N 5/3696; G02B 7/38
See application file for complete search history.

(56) References Cited

U.S. PATENT DOCUMENTS

| 7,714,437 B2 | 5/2010 | Naya |
| 8,836,805 B2 | 9/2014 | Sutton et al. |

(Continued)

FOREIGN PATENT DOCUMENTS

| CN | 1862358 A | 11/2006 |
| CN | 101738698 A | 6/2010 |

(Continued)

OTHER PUBLICATIONS

International Search Report and Written Opinion for Application No. PCT/CN2016/075562, dated Jun. 3, 2016, 7 pages.

(Continued)

*Primary Examiner* — Ahmed A Berhan
(74) *Attorney, Agent, or Firm* — Sheppard Mullin Richter & Hampton LLP

(57) ABSTRACT

The present application discloses various focusing methods and apparatuses, and various photographing devices. The focusing method includes: controlling deformation of an image sensor so that reference points of at least two imaging sub-areas of the image sensor after the deformation form a first relative position relationship in a staggered arrangement along a depth direction; acquiring contrast data of a sampling image of an object in the at least two imaging sub-areas; and determining and/or adjusting, according to at least the first relative position relationship and the contrast data, a focusing state of the image sensor. The present application can improve a speed and/or accuracy for determining and/or adjusting the focusing state of the image sensor.

26 Claims, 10 Drawing Sheets

(56) References Cited

U.S. PATENT DOCUMENTS

| | | |
|---|---|---|
| 2008/0062301 A1 | 3/2008 | Zhou |
| 2008/0151089 A1 | 6/2008 | Street et al. |
| 2011/0075281 A1 | 3/2011 | Liao |
| 2014/0049683 A1* | 2/2014 | Guenter ............... H04N 5/262 348/360 |

FOREIGN PATENT DOCUMENTS

| | | |
|---|---|---|
| CN | 102033287 A | 4/2011 |
| CN | 102147556 A | 8/2011 |
| EP | 1122791 A2 | 8/2011 |

OTHER PUBLICATIONS

Bar-Cohen et al., "Electroactive Polymers for Refreshable Braille Displays," SPIE, Sep. 2009, 3 pages.

Ko et al., "A Hemispherical Electronic Eye Camera Based on Compressible Silicon Optoelectronics," Nature, Aug. 2008, vol. 454, p. 748-753.

Ng et al., "Flexible Image Sensor Array with Bulk Heterojunction Organic Photodiode," Applied Physics Letters, 2008, vol. 92, p. 213303.

Yu et al., "Directed Bending of a Polymer Film by Light," Nature, Sep. 2003, vol. 425, p. 145.

* cited by examiner

A target in focus depth position is at a
depth position in front of the depth scope A target in focus depth position is at a
depth position behind the depth scope A target in focus depth position is at a
depth position between the depth scopes

FOCUSING METHODS AND APPARATUSES, AND PHOTOGRAPHING DEVICES

CROSS-REFERENCE TO RELATED APPLICATIONS

This application is a National Phase Application of International Application No. PCT/CN2016/075562, filed on Mar. 4, 2016, which claims the priority to and benefit of Chinese Patent Application No. 201510131892.3, filed on Mar. 24, 2015, and entitled "Focusing Methods and Apparatuses, and Photographing Devices". Both of the above-referenced applications are incorporated into the present application by reference herein in their entirety.

TECHNICAL FIELD

The present application relates to the field of terminal technologies, and in particular, to various focusing methods and apparatuses, and various photographing devices.

BACKGROUND

Contrast detection focusing technology is one of widely used passive auto focus technologies at present. The principle of the contrast detection focusing technology is that, according to a contrast data change of sampling images at different focus depth positions of a photographing device, a focus depth position corresponding to the maximum contrast data is taken as the optimal focus depth position, that is, a in focus depth position.

For example, when a contrast of the sampling image is used as contrast data, a contrast detection focus process is usually as follows: move a focusing lens along a depth direction; with the movement of the focusing lens, a sampling image acquired at an imaging plane of an image sensor gradually becomes clear and the contrast gradually increases as well; when the sampling image is the clearest, and the contrast is the highest, the imaging plane of the image sensor is at the in focus depth position, which, however, is not known by a photographing device; the photographing device continues to move the lens along the depth direction; when the contrast of the sampling image is found to decrease, it is determined that the photographing device misses the in focus depth position, so the lens is moved in a reverse direction. Such an adjustment is repeated many times, until a position of the imaging plane of the image sensor approaches or coincides with the in focus depth position to the maximum extent. It may be seen that the foregoing contrast detection focus process needs multiple times of "missing" the in focus depth position to achieve auto focus, and a focusing speed is comparatively low.

SUMMARY

A brief summary about the present application is given hereinafter, so as to provide a basic understanding about certain aspects of the present application. It should be understood that the summary is not an exhaustive summary about the present application. It is neither intended to determine critical or important parts of the present application, nor intended to limit the scope of the present application. Its purpose is merely giving some concepts in a simplified form, to be taken as the preamble to be described later in more detail.

Embodiments of the present application provide various focusing methods and apparatuses, and various photographing devices.

According to a first aspect, an embodiment of the present application provides a focusing method, including:

controlling deformation of an image sensor so that reference points of at least two imaging sub-areas of the image sensor after the deformation form a first relative position relationship in a staggered arrangement along a depth direction;

acquiring contrast data of a sampling image of an object in the at least two imaging sub-areas; and determining and/or adjusting, according to at least the first relative position relationship and the contrast data, a focusing state of the image sensor.

According to a second aspect, an embodiment of the present application further provides a focusing apparatus, including:

a deformation control module, configured to control deformation of an image sensor so that reference points of at least two imaging sub-areas of the image sensor after the deformation form a first relative position relationship in a staggered arrangement along a depth direction;

a contrast data acquiring module, configured to acquire contrast data of a sampling image of an object in the at least two imaging sub-areas; and a processing module, configured to determine and/or adjust, according to at least the first relative position relationship and the contrast data, a focusing state of the image sensor.

According to a third aspect, an embodiment of the present application further provides a photographing device, including: a photographing optical system, a deformable image sensor and any focusing apparatus provided by embodiments of the present application.

The technical solutions provided by the embodiments of the present application make full use of the deformable property of an image sensor, and control deformation of the image sensor to make reference points of at least two imaging sub-areas to form a first relative position relationship in a staggered arrangement along a depth direction. The first relative position relationship and the contrast data of the sampling image separately formed in the at least two imaging sub-areas are used as a basis for determining and/or adjusting a focusing state of the image sensor, that is, a change trend of the contrast data of the at least two imaging sub-areas acquired by the photographing device at a focus depth along the depth direction may be determined. According to the change trend, an accuracy for determining the focusing state of the image sensor may be improved, and/or, according to the change trend, determination of focusing parameters, such as an adjusting direction and an adjusting step of the focusing state of the image sensor, may be improved, so that a speed and/or accuracy for adjusting the focusing state of the image sensor may be improved. By adopting the technical solutions provided by the embodiments of the present application, times for adjusting the focusing state needed by an adjustment process of the focusing state may be reduced, and/or the in focus depth position may approach closer to or coincide with a target in focus depth position after the adjustment. In addition, an axis direction of the image sensor in the embodiments of the present application does not change, and keeps perpendicular to the depth direction. The deformation of a surface shape of the image sensor is recoverable, and deformation recover control is easy and convenient, and does not need complicated steps, so that the imaging plane of the image sensor may recover to an original shape, which is beneficial to imaging control and image acquisition of an object after the focusing state is adjusted.

These and other advantages of the present application are more obvious with reference to optional embodiments of the present application described below in detail in combination with the accompanying drawings.

BRIEF DESCRIPTION OF THE DRAWINGS

The present application can be better understood with reference to the description given below in combination with the accompanying drawings, in which the same or similar reference signs are used in all the drawings to indicate the same or similar components. The drawings together with the following detailed description are comprised in the specification and form a part of the specification, and are configured to further exemplify alternative embodiments of the present application and explain the principle and advantages of the present application. In the drawings.

Figure 1A:
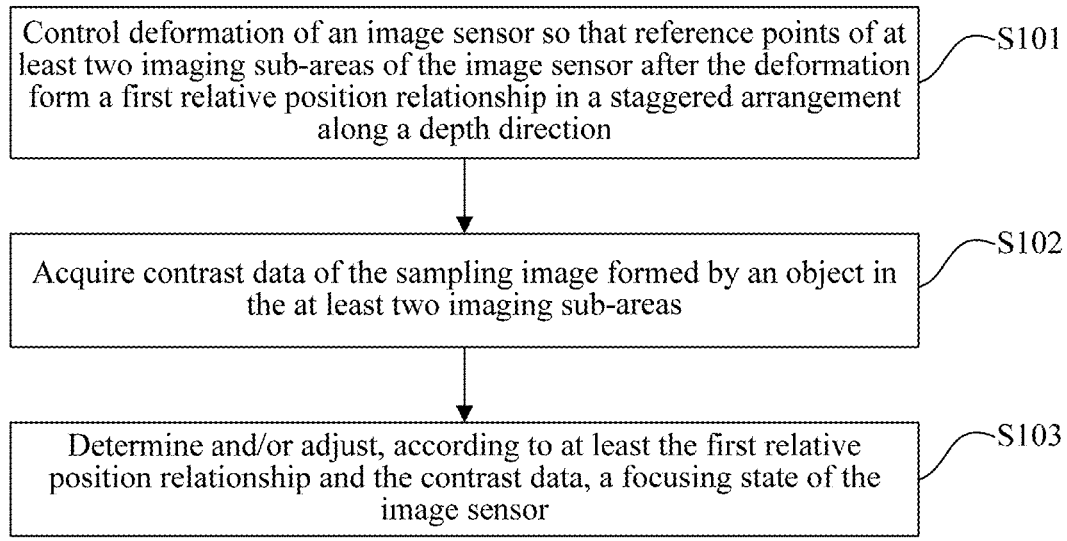
FIG. 1a is a flowchart of a focusing method provided by an embodiment of the present application.

Persons skilled in the art should understand that components in the accompanying drawings are shown merely for simpleness and clearness, and are not always drawn to scale. For example, sizes of some components may be amplified relative to other components, so as to facilitate enhancing the understanding of embodiments of the present application.

DETAILED DESCRIPTION

Exemplary embodiments of the present application are described below in detail with reference to the accompanying drawings. For the sake of clarity and simplicity, not all the features of actual implementations are described in the specification. However, it should be understood that, lots of decisions specific to implementations must be made during development of any such actual embodiment, so as to achieve specific goals of developers, for example, restrictions relevant to systems and services are met, and the restrictions may vary with different implementations. In addition, it should also be understood that, although development work is likely to be very complicated and time-consuming, for those skilled in the art who benefit from the disclosure, the development work is merely a routine task.

Herein, it should also be noted that, in order to avoid blurring the present application due to unnecessary details, only apparatus structures and/or processing steps closely related to solutions according to the present application are described in the accompanying drawings and the specification, but representation and description about members and processing having little to do with the present application and known to those of ordinary skill in the art are omitted.

Specific implementation manners of the present application are further described below in detail with reference to the accompanying drawings (in which like elements are denoted by like reference numerals) and embodiments. The following embodiments are used for describing the present application, but are not intended to limit the scope of the present application.

A person skilled in the art may understand that the terms such as "first" and "second" in the present application are used only to differentiate different steps, devices, modules, or the like, and neither represent any specific technical meaning, nor indicate any logical relationship between the terms.

FIG. 1a is a flowchart of a focusing method provided by an embodiment of the present application. The focusing method provided by the embodiment of the present application may be executed by a focusing apparatus. The type of the focusing apparatus is not limited, for example, the focusing apparatus may be an independent part; or, the focusing apparatus may be integrated in a photographing device as a functional module. The photographing device may include, but is not limited to, a camera, a video camera, a mobile phone, a tablet, and an electronic device having a function of photographing or video shooting, which is not limited in the embodiment of the present application. As shown in FIG. 1a, a focusing method provided by the embodiment of the present application includes:

S101: Control deformation of an image sensor so that reference points of at least two imaging sub-areas of the image sensor after the deformation form a first relative position relationship in a staggered arrangement along a depth direction.

A surface shape of the image sensor described in the embodiment of the present application is deformable. For example, at least a part of the surface shape of the imaging plane of the image sensor may change, and the specific structure and form of components of the image sensor are not limited.

Figure 1B:
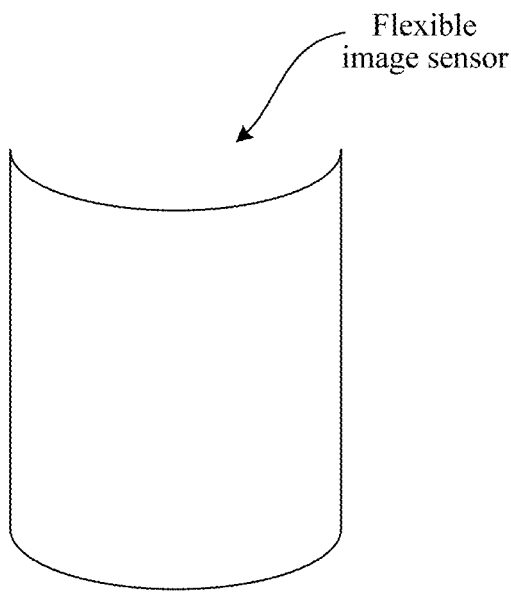
FIG. 1b is an example of a flexible image sensor provided by an embodiment of the present application.

For example, the image sensor may be a flexible image sensor, which has already been applied in some photographing devices. The flexible image sensor may be curved to a certain degree by an external force in the present application, as shown in FIG. 1b, which changes projections of the reference points of the at least two imaging sub-areas of the flexible image sensor in a depth direction, so that the reference points of the at least two imaging sub-areas form a relative position relationship in a staggered arrangement along the depth direction, that is, a first relative position relationship.

Figure 1C:
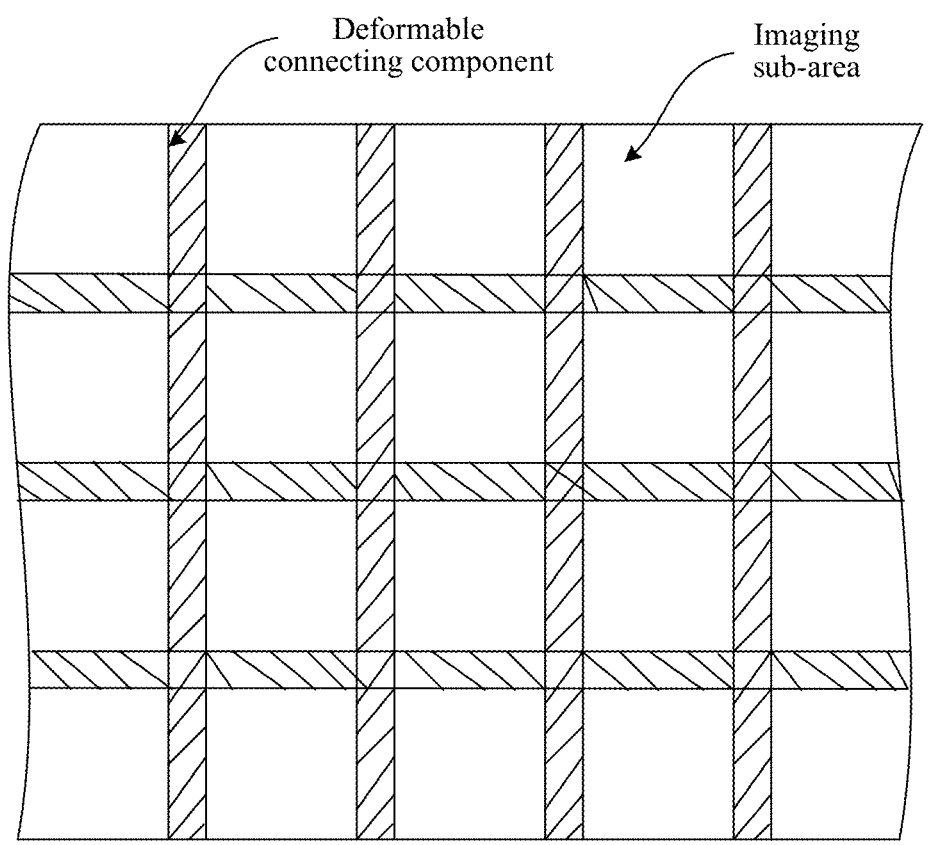
FIG. 1c is an example of an image sensor having multiple imaging sub-areas in an array distribution provided by an embodiment of the present application.

For example, as shown in FIG. 1c, the image sensor may include multiple imaging sub-areas in an array distribution. The at least two imaging sub-areas are connected by a deformable connection component, such as an elastic component or a controlled deformable material component (for example, a photo deformable material component, a magnetic deformable material component, a piezoelectric material component, and the like), to form the whole imaging plane. By controlling the deformation of the deformable connection component, the first relative position relationship may be controlled to be formed in the depth direction between the at least two imaging sub-areas. The external force or an external field is applied on the connection component in the present application, so that the corresponding imaging sub-areas are driven to move along the depth direction, that is, move relative to a reference position of the whole original imaging plane of the image sensor along the depth direction to protrude or concave from the imaging plane, so that projection positions of the reference points of the at least two imaging sub-areas in the depth direction are different, thereby forming the relative position relationship in a staggered arrangement along the depth direction, that is, the first relative position relationship.

It may be understood that, according to the need of an actual application, the foregoing imaging sub-areas in the array distribution and the flexible image sensor may also be used in combination to form a deformable image sensor.

Any one of the imaging sub-areas may include at least one image sensor pixel point. In an actual application, according to the need of the actual application, any point in an imaging sub-area may be taken as a reference point of this imaging sub-area. For example, a central point of the imaging sub-area or one point between the center and an edge is taken as the reference point, to facilitate comparison between the relative positions of different imaging sub-areas in the depth direction.

S102: Acquire contrast data of the sampling image formed by an object in the at least two imaging sub-areas.

When elements in the photographing device, such as a photographing optical system and the image sensor, are at one focus position, the imaging plane of the image sensor may receive light of the object to acquire the sampling image. The contrast data of the sampling image separately formed in the at least two imaging sub-areas of the image sensor may include, but is not limited to, contrast data or sharpness data of the sampling image separately formed in the at least two imaging sub-areas.

S103: Determine and/or adjust, according to at least the first relative position relationship and the contrast data, a focusing state of the image sensor.

The photographing device usually has an ideal in focus position in order to acquire a clear image of the object, and the ideal in focus position may be referred to as a target in focus depth position. In an auto focus process, the target in focus depth position usually is unknowable in advance, and the target in focus depth position may be acquired through slow convergence in the focusing process. However, limited by factors such as adjustment accuracy and an optical system limit, sometimes the target in focus depth position may not be reached precisely in the actual focusing and adjusting process. Therefore, in the actual adjusting process, the target in focus depth position may be approached to the maximum extent. If times of focusing and adjusting reach the maximum times for adjusting, or a focus error after the adjustment is in an allowable range, or the like, then it is determined that the focusing is completed.

In a conventional contrast detection focusing process, the imaging plane of the image sensor is usually perpendicular to the depth direction, especially in an initial adjustment (first-time adjustment) phase. According to the contrast data of the sampling image acquired by the photographing device in a single depth focus position, the focusing state of the image sensor is difficult to be determined. For example, it is difficult to determine whether the current depth position of the imaging plane of the image sensor in the photographing device is the optimal focus depth position or meets a focusing requirement of the focus; or the relative position relationship between the current depth position of the imaging plane of the image sensor in the photographing device and the target in focus depth position cannot be determined. Therefore, it cannot be determined whether the focusing state of the photographing device needs to be adjusted; or an adjusting direction of the focusing state of the photographing device cannot be determined (for example, it is not known whether a lens position should be adjusted to be moved forward or backward along the depth direction). In this case, the focus depth position of the photographing device needs to be changed, for example, the lens is moved forward or backward one step along the depth direction, and then the contrast data of the sampling image is acquired. If a difference of the contrast of the sampling images at the two focus depth positions is positive, it indicates that the adjustment direction of the lens is correct this time, and the lens is moved toward the direction in which the contrast is the greatest. If a difference of the contrast of the sampling images at the two focus depth positions is negative, it indicates that the adjustment direction of the lens is reverse, and the focus depth position needs to be adjusted in an opposite direction. Through such adjustment repeated for many times, the depth position of the imaging plane of the image sensor approaches or coincides with the target in focus depth position to the maximum extent. Apparently, the focusing speed is slow.

The technical solution provided by the embodiment of the present application makes full use of the deformable property of the image sensor, and controls deformation of the image sensor to make reference points of the at least two imaging sub-areas form a first relative position relationship in a staggered arrangement along the depth direction. The first relative position relationship and the contrast data of a sampling image separately formed in the at least two imaging sub-areas are used as a basis for determining and/or adjusting a focusing state of the image sensor, that is, a change trend of the contrast data of the at least two imaging sub-areas acquired by the photographing device at a focus depth along the depth direction may be determined. According to the change trend, an accuracy for determining the focusing state of the image sensor may be improved, and/or, according to the change trend, determination of focusing parameters, such as an adjusting direction and an adjusting step of the focusing state of the image sensor, may be improved, so that a speed and/or accuracy for adjusting the focusing state of the image sensor may be improved. By adopting the technical solution provided by the embodiment of the present application, times for adjusting the focusing state needed by an adjustment process of the focusing state may be reduced, for example, in some cases, 1 to 4 times adjustment of the focusing state may complete the focusing, and/or, may make the in focus depth position be closer to or coincide with the target in focus depth position after the adjustment. In addition, an axis direction of the image sensor in the embodiment of the present application does not change, and keeps perpendicular to the depth direction. The deformation of a surface shape of the image sensor is recoverable, and deformation recover control is easy and convenient, and does not need complicated steps, so that the imaging plane of the image sensor may recover to an original shape, which is beneficial to imaging control and image acquisition of an object after the focusing state is adjusted.

In the description of the present application, the description involving "and/or" represents three situations, for example, A and/or B includes the situation of A, the situation of B, and the situation of A and B. To be specific, determining and/or adjusting the focusing state of the image sensor includes three situations. The first situation is determining the focusing state of the image sensor. For example, according to at least the first relative position relationship and the contrast data of the respective sampling images of the at least two imaging sub-areas, it is determined whether the current position of the image sensor is a preferred focus position. The second situation is adjusting the focusing state of the image sensor. For example, according to at least the first relative position relationship and the contrast data of the respective sampling images of the at least two imaging sub-areas, a direction and step of adjustment of the lens of the photographing device are determined to adjust a difference between the depth position of the image sensor and the target in focus depth position. The third situation is determining the focusing state of the image sensor and adjusting the focusing state of the image sensor. For example, it is determined that the current position of the image sensor is not a preferred focus position, and the focusing state is adjusted.

Optionally, the according to at least the first relative position relationship and the contrast data, determining and/or adjusting the focusing state of the image sensor includes: determining, according to at least the first relative position relationship and the contrast data, second relative position information, which is in the depth direction, of depth scopes that correspond to the at least two imaging areas relative to a target in focus depth position that corresponds to the object; and determining and/or adjusting, according to at least the second relative position information, the focusing state of the image sensor. The solution takes the depth scopes corresponding to the at least two imaging sub-areas as an integral whole, and combines with the contrast data of the sampling images corresponding to the at least two imaging sub-areas, for example, combines with a change trend of the contrast data of the respective sampling images of the at least two imaging sub-areas, and determines and/or adjusts the focusing state of the image sensor, thereby improving a speed and/or accuracy for determining and/or adjusting the focusing state of the image sensor.

The manner for determining the second relative position information is very flexible.

Optionally, in response to that the contrast data corresponding to the at least two imaging sub-areas shows a unidirectional change trend, it is determined that the target in focus depth position is out of the depth scopes corresponding to the at least two imaging sub-areas. In the solution, according to that the contrast data corresponding to the at least two imaging sub-areas shows the unidirectional change trend, the change trend of the contrast data of other imaging sub-areas with the change of the depth is known. For example, the contrast data decreases with the increase of the depth, or the contrast data increases with the increase of the depth; therefore it is determined that the target in focus depth position is not at the depth scopes corresponding to the at least two imaging sub-areas, but is out of the depth scopes. In this case, if the focusing state of the image sensor needs to be adjusted, the adjustment direction may be determined, and the depth scope may be used as a setting basis of the focusing parameters, such as the adjustment of the step, thereby improving the speed and/or accuracy for adjusting the focusing state.

The unidirectional change trend indicates the contrast data respectively corresponding to the at least two imaging sub-areas, and progressively increases in sequence with the increase of the depth, or progressively decreases in sequence with the increase of the depth. For example, in response to that the contrast data corresponding to the at least two imaging sub-areas shows a first unidirectional change trend matching the first relative position relationship, it is determined that the target in focus depth position is located in a depth position behind the depth scopes corresponding to the at least two imaging sub-areas. For example, in response to that the contrast data corresponding to the at least two imaging sub-areas shows a second unidirectional change trend opposite to the first relative position relationship, it is determined that the target in focus depth position is at a depth position in front of the depth scopes corresponding to the at least two imaging sub-areas. The foregoing solution may improve the accuracy for determining the relative position of the target in focus depth position, thereby helping to improve the speed and/or accuracy for determining and/or adjusting the focusing state of the image sensor.

Optionally, in response to that the contrast data corresponding to the at least two imaging sub-areas shows a non-unidirectional change trend, it is determined that the target in focus depth position is between the depth scopes corresponding to the at least two imaging sub-areas. In the solution, according to that the contrast data corresponding to the at least two imaging sub-areas shows a non-unidirectional change trend, it may be known that a depth position in the depth scope of the at least two imaging sub-areas is the target in focus depth position. In this case, if the depth scope meets a preset requirement for the focus accuracy, it may be determined that the image sensor is in an in focusing state; and if the focusing state of the image sensor needs to be adjusted, the depth scope may be taken as a setting basis of the focusing parameters, such as the adjustment of the step (for example, the step is adjusted to be smaller than the depth scope), thereby improving the speed and/or accuracy of adjusting the focusing state. The non-unidirectional change trend indicates that, with the direction in which the depth progressively increases or decreases, the contrast data corresponding to the depth scope does not progressively increase or decrease correspondingly, but shows a fluctuant change relationship or horizontal change relationship similar to a curve with inflection points.

After the second relative position information is determined, according to at least the second relative position information, the focusing state of the image sensor may be determined and/or adjusted. The adjustment of the focusing state of the image sensor may include: according to at least the second relative position information, adjusting the focusing parameters of the photographing device including the image sensor so that the image plane of the image sensor approaches or coincides with the target in focus depth position after the focusing parameters are adjusted. The focusing parameters of the photographing device may include, but are not limited to, at least one of the following: a position (for example, a lens position), focal length of a lens, a position of the image sensor, and the adjustment step of the photographing optical system in the photographing device. This solution implements the adjustment of the focusing state in combination with the second relative position information, to make the adjustment of the focusing state more targeted and directional, and even if in an initial adjustment phase of an adjustment process of the focusing state, blindly tentative adjustment can also be avoided, thereby improving the speed and/or accuracy for determining and/or adjusting the focusing state.

FIG. 2a to FIG. 2d are used as an example for further description. As an example, the surface shape of the image sensor after the deformation is shown in the FIG. 2a. The reference points of the two imaging sub-areas of the image sensor form a relative position relationship in a staggered arrangement along a depth direction. The depth position relationship of the two imaging sub-areas and a contrast change trend in the depth scope may be taken as a basis for determining and/or adjusting the focusing state of the image sensor. In the drawing, a direction of an arrow in a vertical coordinate represents a direction in which the contrast increases, and a direction of an arrow in a horizontal coordinate represents a direction in which the depth increases. A larger depth indicates that the position of the photographing device is far away from an object. On the contrary, a smaller depth indicates that the position of the photographing device is far away from the shooting subject. The target in focus depth position is a position where the sampling image has the highest contrast (that is, the depth position corresponding to the highest point of the curve).

Figure 2A:
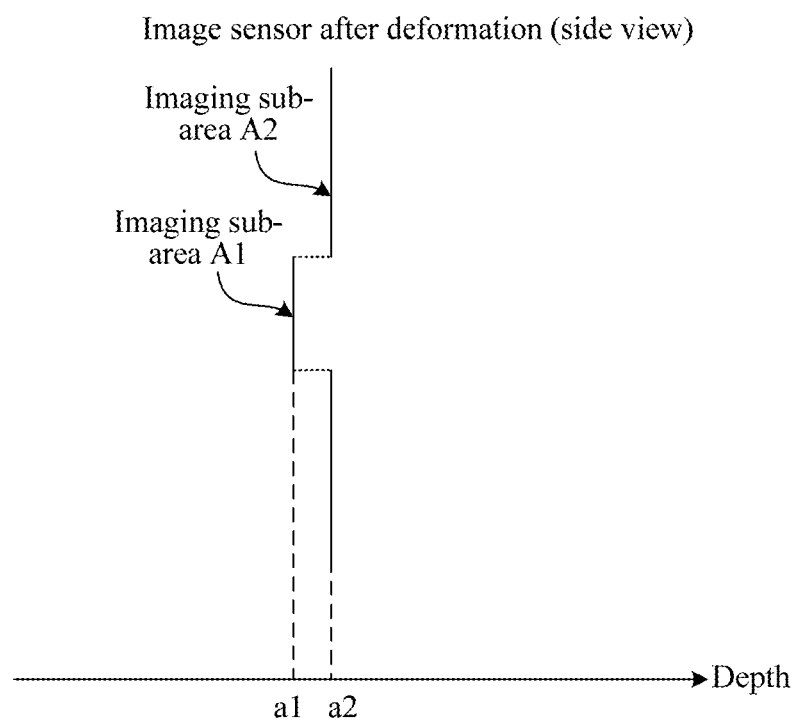
FIG. 2a to FIG. 2d show an example of utilizing an embodiment of the present application.
Figure 2B:
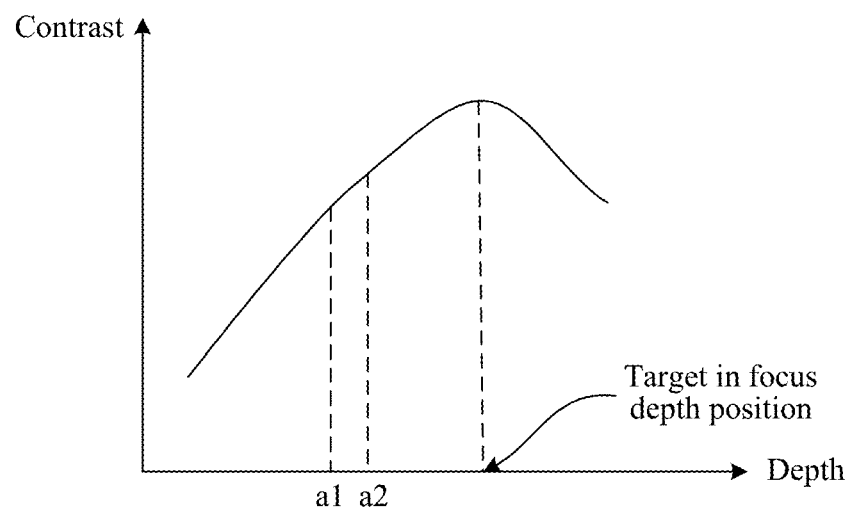

In an optional example shown in FIG. 2b, the depth position coordinates of the imaging sub-areas A1 and A2 progressively increase (a1<a2), and the contrast corresponding to the depth scopes a1 to a2 increases progressively with the increase of the depth. That is, the contrast data corresponding to the imaging sub-areas A1 and A2 shows a first unidirectional change trend matching the first relative position relationship of the imaging sub-areas A1 and A2 in the depth direction. In this case, it may be determined that the target in focus depth position is at a depth position behind the depth scope (greater than a2). If the focusing state of the image sensor needs to be adjusted, the photographing device needs to be adjusted along a direction in which the depth position coordinate corresponding to the position of the image sensor after the adjustment is greater than a2.

Figure 2C:
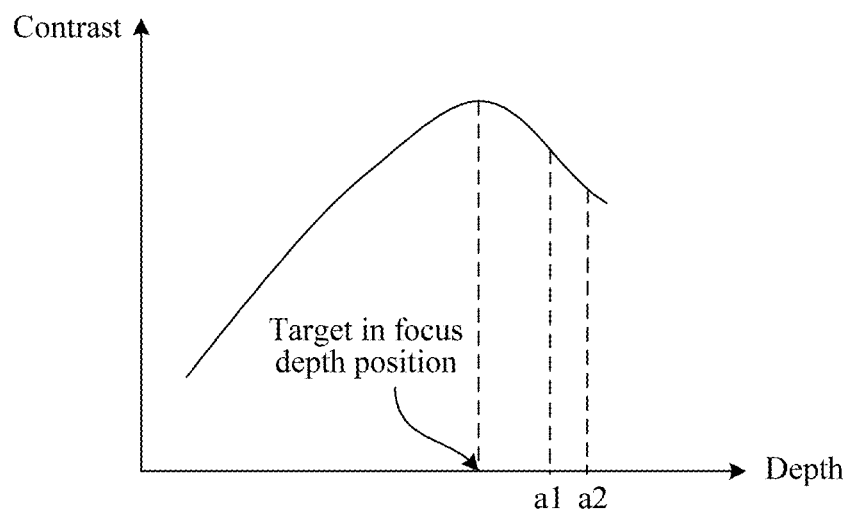

In an optional example shown in FIG. 2c, the depth position coordinates of the imaging sub-areas A1 and A2 progressively increase (a1<a2), and the contrast data corresponding to the depth scopes a1 to a2 progressively increases with the increase of the depth. That is, the contrast data corresponding to the imaging sub-areas A1 and A2 shows a second unidirectional change trend opposite to the first relative position relationship of the imaging sub-areas A1 and A2 in the depth direction. In this case, it may be determined that the target in focus depth position is at a depth position in front of the depth scope (less than a1). If the focusing state of the image sensor needs to be adjusted, the photographing device needs to be adjusted along the direction in which the depth position coordinate corresponding to the position of the image sensor after the adjustment is less than a1.

Figure 2D:
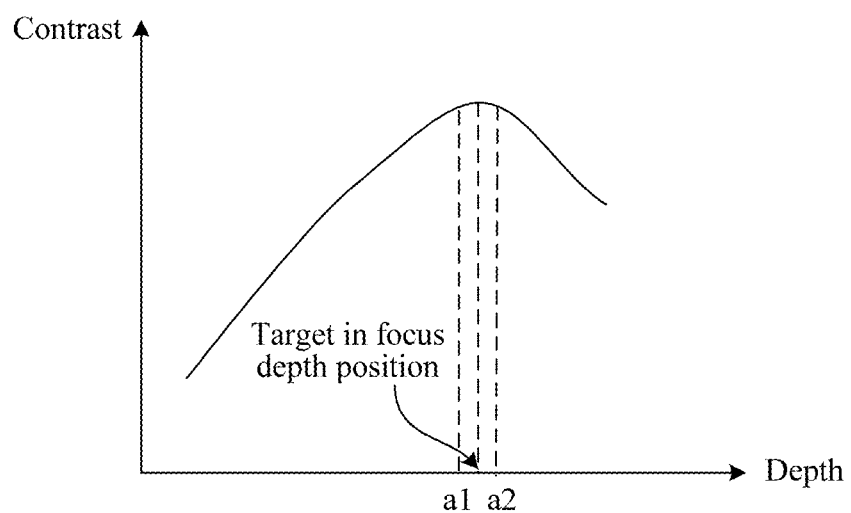

In an optional example as shown in FIG. 2d, the depth position coordinates of the imaging sub-areas A1 and A2 progressively increase (a1<a2), and the contrast data corresponding to the depth scopes a1 to a2 shows a trend that increases firstly and then decreases. That is, the contrast data corresponding to the imaging sub-areas A1 and A2 shows a non-unidirectional change trend. In this case, it may be determined that the target in focus depth position is at a depth position between the depth scopes a1 and a2. If the focusing state of the image sensor needs to adjusted, the photographing device needs to be adjusted by step along the direction in which the depth position coordinate corresponding to the position of the image sensor after the adjustment is between a1 and a2.

It may be seen that, when the technical solution provided by the embodiment of the present application is adopted, the focusing state may be determined and/or adjusted in a more aimed and efficient manner, which facilitates faster and more accurate auto focus.

On the basis of any one of the technical solutions provided by the embodiments of the present application, optionally, before controlling deformation of the image sensor, the focusing method further includes: determining a deformation degree of the image sensor. Maximum deformation along the depth direction of the at least two imaging sub-areas corresponding to an initial adjustment phase of the adjustment process of the focusing state is greater than maximum deformation along the depth direction of the at least two imaging sub-areas corresponding to other phases of the adjustment process of the focusing state. That is, the adjustment process of the focusing state may include one or more times of focusing, and each time the focusing may be implemented by using any one of the focusing methods provided by the embodiment of the present application to improve the speed and/or accuracy for determining and/or adjusting the focusing state. Corresponding to the different phases of the adjustment process of the focusing state, the deformation degree of the image sensor may be not the same. The adjustment process of the focusing state usually may include the initial adjustment phase (performing the first-time adjustment), an intermediate phase and a convergence phase (for example, performing the last time adjustment or last several times of adjustment), and the maximum deformation of the image sensor may be determined in an aimed manner corresponding to the different phases. For example, the maximum deformation is determined in the initial adjustment phase, while the maximum deformation in other phases is less than the maximum deformation in the initial adjustment phase, so that the maximum deformation of the image sensor changes from large to small at least once along with the initial adjustment process of the focusing state, which is equivalent to comparing the depth scope that decreases gradually as a whole with the corresponding contrast data, so as to improve the convergence efficiency, and determine and/or adjust the focusing state more quickly and more accurately. Optionally, from the initial adjustment phase to the convergence phase of the adjustment process of the focusing state, the maximum deformation along the depth direction of the at least two imaging sub-areas corresponding to the phases progressively decreases in sequence. This solution further improves the convergence efficiency, and can determine and/or adjust the focusing state more quickly and more accurately.

Figure 3:
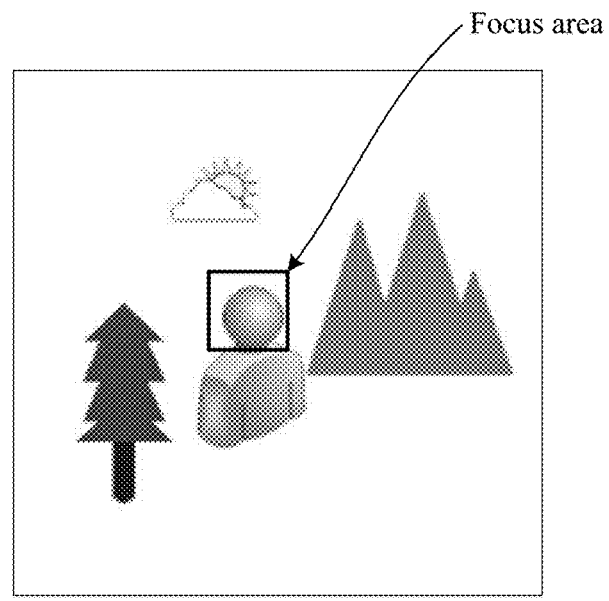
FIG. 3 is an example of a focus area provided by an embodiment of the present application.

On the basis of any one of the technical solutions provided by the embodiments of the present application, optionally, before controlling the deformation of the image sensor, the focusing method further includes: determining, according to a preview image of an object, a focus area; and determining, according to the focus area, the at least two imaging sub-areas, where the at least two imaging sub-areas respectively correspond to at least two focus sub-areas included in the focus area. The focus area usually corresponds to an area where clear imaging is desired, and the whole or a part of the preview image may be determined as the focus area according to the preview image of the object. For example, the focus area may be determined according to information selected by a user in the preview image, or the focus area may be determined according to an image analysis result of the preview image. For example, it is determined that a recognized human head area is determined as the focus area (as shown in FIG. 3), and the implementation manner is flexible. After the focus area is determined, the imaging area corresponding to the focus area may be determined in the imaging plane of the image sensor according to the focus area, that is, the at least two imaging sub-areas, where each of the imaging sub-areas corresponds to a focus sub-area in the focus area. A main objective of adjusting the focusing state is usually to adjust the depth position of the imaging area corresponding to the focus area on the image sensor, so that the imaging area approaches or coincides with the target in focus depth position to the maximum extent, so that a part of an image that is actually taken corresponding to the focus area is the clear image. Therefore, this solution determines the at least two imaging sub-areas according to the focus area, and determines and/or adjusts, according to the first relative position relationship in the depth direction of the at least two imaging sub-areas and the contrast data of the sampling image, the focusing state of the image sensor, so as to acquire the image in which the part corresponding to the focus area is clear.

Optionally, a quantity of the imaging sub-areas may be determined according to content of the focus area. In this solution, the imaging area of the image sensor corresponding to the focus area is divided into a plurality of the imaging sub-areas, and the first relative position relationship of the depth positions in a staggered arrangement of the different imaging sub-areas is formed in the depth direction. In this way, the whole depth scope corresponding to the imaging area or a depth sub-scope of any two imaging sub-areas in the imaging area is taken as a measurement reference unit for determining and/or adjusting the focusing state of the image sensor, thereby improving the speed and/or accuracy for determining and/or adjusting of the focusing state, and helping to decide, according to the quantity of the reasonable imaging sub-areas determined by the content of the focus area, a focusing solution in an aimed manner, and reduce complexity of the solution as much as possible. For example, the quantity of the imaging sub-areas corresponding to the focus area whose content has more details is greater than the quantity of the imaging sub-areas corresponding to the focus area whose content has fewer details. A degree of details of the content may be but is not limited to being reflected by a change of a grey scale in a grey-scale map in the focus area. If the grey scale in the grey-scale map of the focus area varies a lot, it indicates that the degree of details of the content of the focus area is great. Otherwise, if the grey scale in the grey-scale map of the focus area even varies little, it indicates that the content of the focus area is simple, and the degree of details is small. According to the different detail degrees of content of the focus area, the quantity of the imaging areas corresponding to the focus area is determined in an aimed manner, thereby providing more useful reference information for determining and/or adjusting the focusing state of the image sensor, and further improving the speed and/or accuracy for adjusting the focusing state.

Figure 4A:
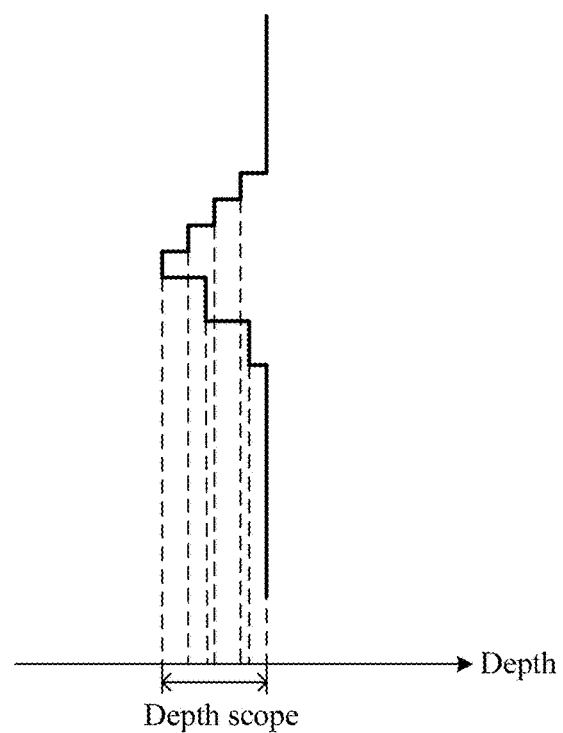
FIG. 4a to FIG. 4d show another example of utilizing an embodiment of the present application.
Figure 4B:
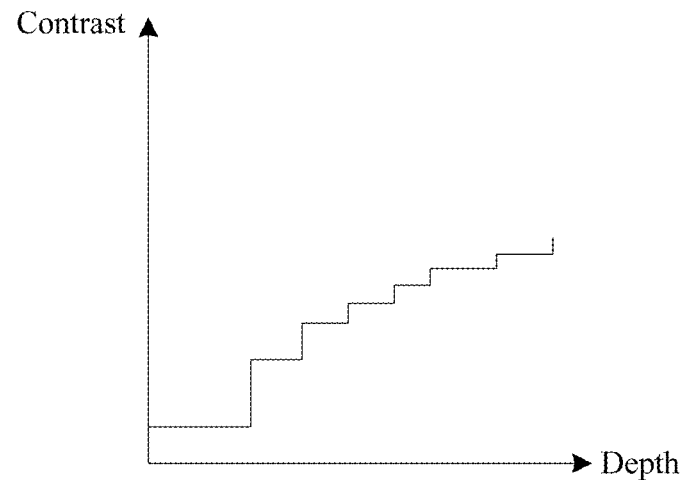
Figure 4C:
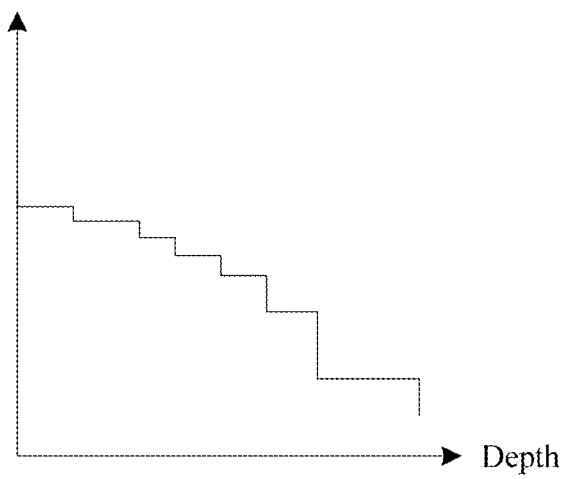
Figure 4D:
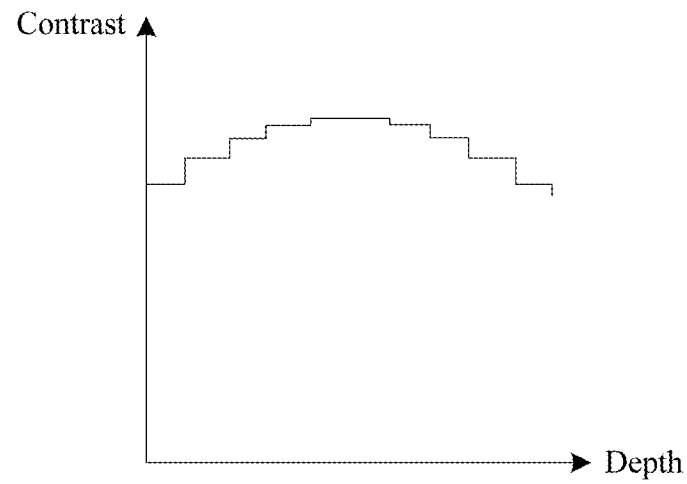

FIG. 4a to FIG. 4d are taken as an example for further description. It is assumed that the degree of details of the content of the focus area is very great, a plurality of the imaging sub-areas may be determined, and the deformation of the image sensor may be controlled to make the imaging sub-areas form the first relative position relationship in a staggered arrangement in the depth direction. The surface shape of the image sensor after the deformation is as shown in FIG. 4a. If the change trend of the contrast data of the imaging sub-areas presents a case as shown in FIG. 4b, that is, the first unidirectional change trend matching the first relative position relationship of the imaging sub-areas in the depth direction, it may be determined that the target in focus depth position is at a depth position behind a maximum depth scope of the imaging sub-areas. If the change trend of the contrast data of the imaging sub-areas presents a case as shown in FIG. 4c, that is, the second unidirectional change trend opposite to the first relative position relationship of the imaging sub-areas in the depth direction, it may be determined that the target in focus depth position is at a depth position in front of the maximum depth scope of the imaging sub-areas. If the change trend of the contrast data of the imaging sub-areas presents a case as shown in FIG. 4d, that is, the non-unidirectional change trend of the imaging sub-areas along the depth direction, it may be determined that the target in focus depth position is at a depth location between the maximum depth scopes of the imaging sub-areas. Because the imaging sub-areas are divided more precisely, the depth sub-scope and the contrast data of any two imaging sub-areas in the imaging sub-areas may be fully used to determine and/or adjust the focusing state of the image sensor. For example, the focusing parameters, such as the adjusting step of the focusing state, may also be determined by referring to the depth sub-scope of any two imaging sub-areas, thereby further improving the speed and/or accuracy for determining and/or adjusting the focus.

A person skilled in the art may understand that in any one of the foregoing methods of the specific implementation manners of the present application, the value of the serial number of each step does not mean an execution sequence, and the execution sequence of each step should be determined according to the function and internal logic thereof, and should not be any limitation on the implementation procedure of the specific implementation manners of the present application.

Figure 5:
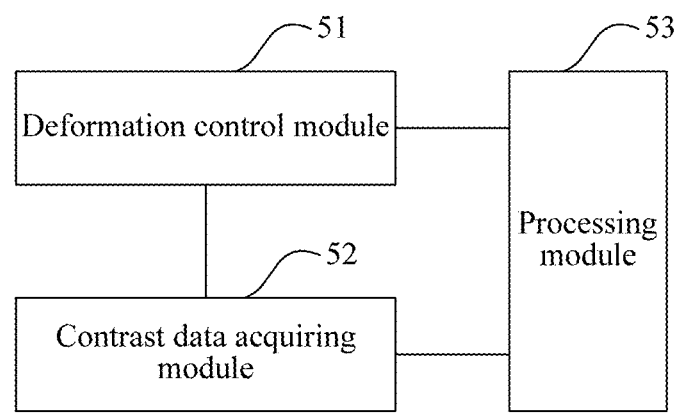
FIG. 5 is a logic block diagram of a first focusing apparatus provided by an embodiment of the present application.

FIG. 5 is a logic block diagram of a focusing apparatus provided by an embodiment of the present application. As shown in FIG. 5, a focusing apparatus provided by the embodiment of the present application includes: a deformation control module 51, a contrast data acquiring module 52 and a processing module 53.

The deformation control module 51 is configured to control deformation of an image sensor so that reference points of at least two imaging sub-areas of the image sensor after the deformation form a first relative position relationship in a staggered arrangement along a depth direction.

The contrast data acquiring module 52 is configured to acquire contrast data of a sampling image formed by an object in the at least two imaging sub-areas. The processing module 53 is configured to determine and/or adjust, according to at least the first relative position relationship and the contrast data, a focusing state of the image sensor.

The technical solution provided by the embodiment of the present application makes full use of the deformable property of the image sensor, and controls deformation of the image sensor to make the reference points of the at least two imaging sub-areas to form the first relative position relationship in a staggered arrangement along the depth direction. The first relative position relationship and the contrast data of the sampling image separately formed in the at least two imaging sub-areas are used as a basis for determining and/or adjusting the focusing state of the image sensor, that is, a change trend of the contrast data of the at least two imaging sub-areas acquired by the photographing device at a focus depth along the depth direction may be determined. According to the change trend, an accuracy for determining the focusing state of the image sensor may be improved, and/or, according to the change trend, determination of focusing parameters, such as an adjusting direction and an adjusting step of the focusing state of the image sensor, may be improved, so that a speed and/or accuracy for adjusting the focusing state of the image sensor may be improved. By adopting the technical solution provided by the embodiment of the present application, times for adjusting the focusing state needed by an adjustment process of the focusing state may be reduced, and/or the in focus depth position after the adjustment may be closer to or coincide with the target in focus depth position. In addition, an axis direction of the image sensor in the embodiment of the present application does not change, and keeps perpendicular to the depth direction. The deformation of a surface shape of the image sensor is recoverable, and deformation recover control is easy and convenient, and does not need complicated steps, so that the imaging plane of the image sensor may recover to an original shape, which is beneficial to imaging control and image acquisition of an object after the focusing state is adjusted.

Figure 6:
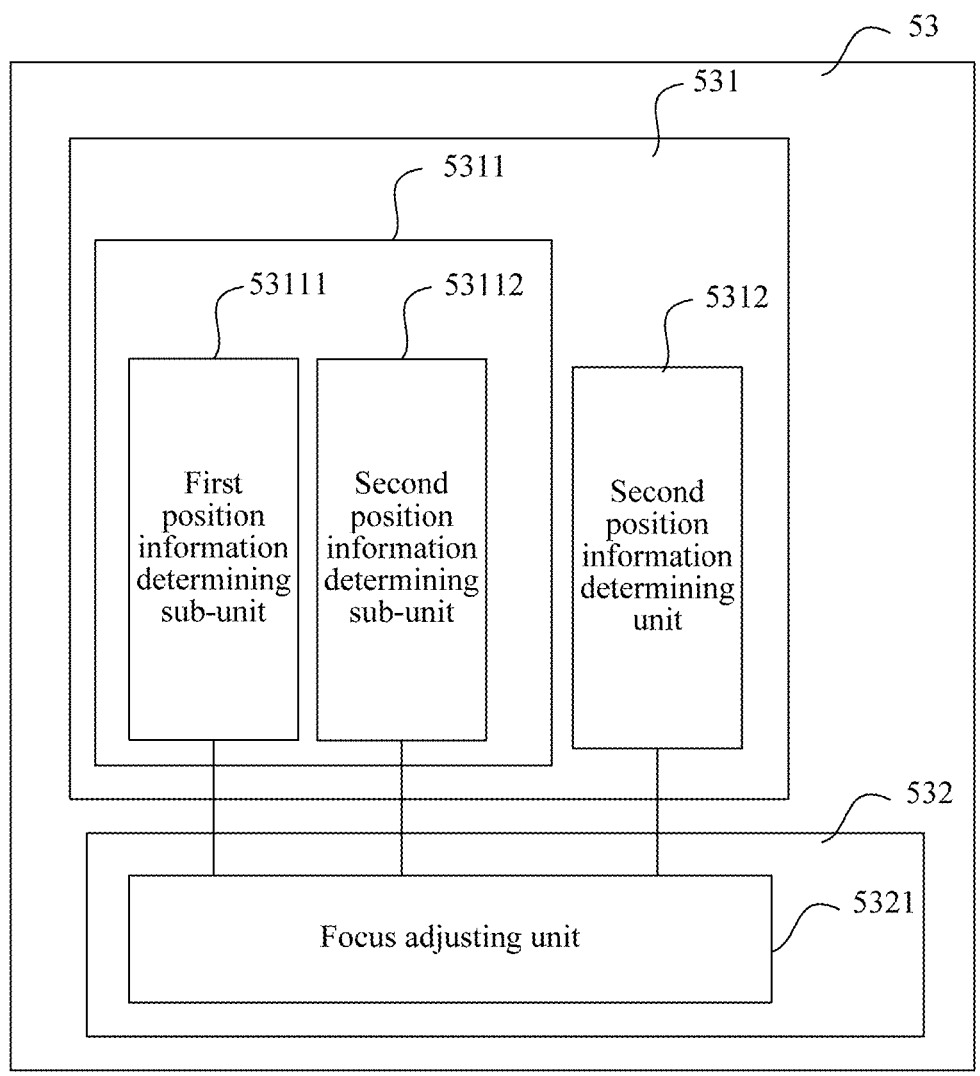
FIG. 6 is a logic block diagram of a processing module provided by an embodiment of the present application.

Optionally, as shown in FIG. 6, the processing module 53 includes: a position information determining sub-module 531 and a processing sub-module 532. The position information determining sub-module 531 is configured to determine, according to at least the first relative position relationship and the contrast data, second relative position information, which is in the depth direction, of depth scopes that correspond to the at least two imaging areas relative to a target in focus depth position that corresponds to the object. The processing sub-module 532 is configured to determine and/or adjust, according to at least the second relative position information, the focusing state of the image sensor. The solution takes the depth scopes corresponding to the at least two imaging sub-areas as an integral whole, which is combined with the contrast data of the sampling images corresponding to the at least two imaging sub-areas, for example, combined with a change trend of the contrast data of the respective sampling images of the at least two imaging sub-areas, so as to determine and/or adjust the focusing state of the image sensor, thereby improving the speed and accuracy for determining and/or adjusting the focusing state of the image sensor.

Optionally, the position information determining sub-module 531 includes: a first position information determining unit 5311. The first position information determining unit 5311 is configured to determine, in response to that the contrast data corresponding to the at least two imaging sub-areas presents a unidirectional change trend, that the target in focus depth position is out of depth scopes corresponding to the at least two imaging sub-areas. In the solution, according to that the contrast data corresponding to the at least two imaging sub-areas presents the unidirectional change trend, the change trend of the contrast data of the sampling images of the other imaging sub-areas with the change of the depth may be known. For example, the change trend decreases with the increase of the depth, or the change trend increases with the increase of the depth. Therefore, it is determined that the target in focus depth position is not in the depth scopes corresponding to the at least two imaging sub-areas, but is out of the depth scopes. If the adjustment of the focusing state of the image sensor needs to be implemented, the adjustment direction may be determined, and the depth scope may be taken as a setting basis of the focus parameters, such as the adjusting step, thereby improving the speed and/or accuracy for adjusting the focusing state.

Optionally, the first position information determining unit 5311 includes: a first position information determining sub-unit 53111. The first position information determining sub-unit 53111 is configured to determine, in response to that the contrast data corresponding to the at least two imaging sub-areas presents a first unidirectional change trend matching with the first relative position relationship, that the target in focus depth position is at a depth position behind the depth scopes corresponding to the at least two imaging sub-areas. This solution may improve the accuracy for determining the relative position of the target in focus depth position, thereby helping to improve the speed and/or accuracy for determining and/or adjusting the focusing state of the image sensor.

Optionally, the first position information determining unit 5311 includes: a second position information determining sub-unit 53112. The second position information determining sub-unit 53112 is configured to determine, in response to that the contrast data corresponding to the at least two imaging sub-areas presents a second unidirectional change trend opposite to the first relative position relationship, that the target in focus depth position is at a depth position in front of the depth scopes corresponding to the at least two imaging sub-areas. This solution may improve the accuracy for determining the relative position of the target in focus depth position, thereby helping to improve the speed and/or accuracy for determining and/or adjusting the focusing state of the image sensor.

Optionally, the position information determining sub-module 531 includes: a second position information determining unit 5312. The second position information determining unit 5312 is configured to determine, in response to that the contrast data corresponding to the at least two imaging sub-areas presents a non-unidirectional change trend, that the target in focus depth position is between the depth scopes corresponding to the at least two imaging sub-areas. This solution may improve the accuracy for determining the relative position of the target in focus depth position, thereby helping to improve the speed and/or accuracy for determining and/or adjusting the focusing state of the image sensor.

Optionally, the processing sub-module 532 includes: a focus adjusting unit 5321. The focus adjusting unit 5321 is configured to adjust, according to at least the second relative position information, focusing parameters of a photographing device including the image sensor so that an imaging plane position of the image sensor approaches to or coincides with the target in focus depth position after the focusing parameters are adjusted. This solution implements the adjustment of the focusing state in combination with the second relative position information to make the adjustment of the focusing state more targeted and directional, and even if in an initial adjustment phase of an adjustment process of the focusing state, a blindly tentative adjustment is also be avoided, thereby improving the speed and/or accuracy for determining and/or adjusting the focusing state.

Figure 7:
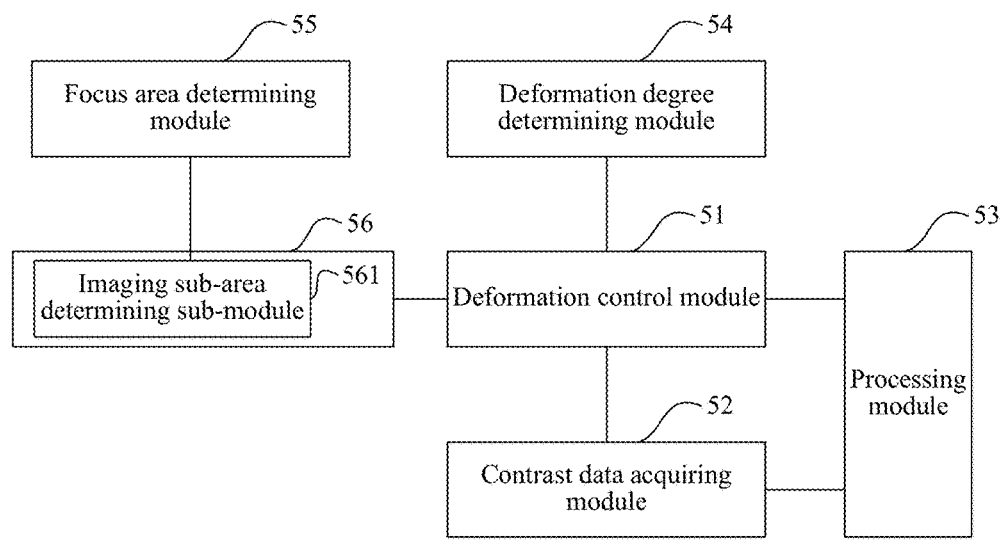
FIG. 7 is a logic block diagram of a second focusing apparatus provided by an embodiment of the present application.

Optionally, as shown in FIG. 7, the focusing apparatus further includes: a deformation degree determining module 54. The deformation degree control module 54 is configured to determine a deformation degree of the image sensor, where maximum deformation along the depth direction of the at least two imaging sub-areas corresponding to an initial adjustment phase of an adjustment process of the focusing state is greater than the maximum deformation along the depth direction of the at least two imaging sub-areas corresponding to other phases of the adjustment process of the focusing state. This solution helps to improve convergence efficiency, and implement more quickly and more accurately to determine and/or adjust the focusing state.

Optionally, since the initial adjustment phase of the adjustment process of the focusing state to a convergence phase, the maximum deformation along the depth direction of the at least two imaging sub-areas corresponding to the phases progressively decreases in sequence. This solution helps to further improve the convergence efficiency, and implement more quickly and more accurately to determine and/or adjust the focusing state.

Optionally, the imaging control apparatus further includes: a focus area determining module 55 and an imaging sub-area determining module 56. The focus area determining module 55 is configured to determine, according to a preview image of the object, the focus area; and the imaging sub-area determining module 56 is configured to determine, according to the focus area, the at least two imaging sub-areas, where the at least two imaging sub-areas respectively corresponds to the at least two focus sub-areas included in the focus area. This solution determines the at least two imaging sub-areas according to the focus area, and implements to determine and/or adjust the focusing state of the image sensor according to the first relative position relationship of the at least two imaging sub-areas in the depth direction and the contrast data of the sampling image, so as to help acquiring the image of the clear imaging of the focus area.

Optionally, the imaging sub-areas determining module 56 includes: an imaging sub-area determining module 561. The imaging sub-area determining sub-module 561 is configured to determine, according contents of the focus area, a quantity of the imaging sub-areas. This solution may determine, according to the contents of the focus area, the quantity of the reasonable imaging sub-areas, which helps to pointedly adopt a focus solution, and reduce complexity of the solution as much as possible.

Optionally, the quantity of the imaging sub-areas corresponding to the focus area whose content has more details is greater than the quantity of the imaging sub-areas corresponding to the focus area whose content has fewer details. According to different detail degrees of content of the focus area, the quantity of the imaging sub-areas corresponding to the focus area is determined in an aimed manner, thereby providing more useful reference information for determining and/or adjusting the focusing state of the image sensor, and further improving the speed and/or accuracy for adjusting the focusing state.

Figure 8:
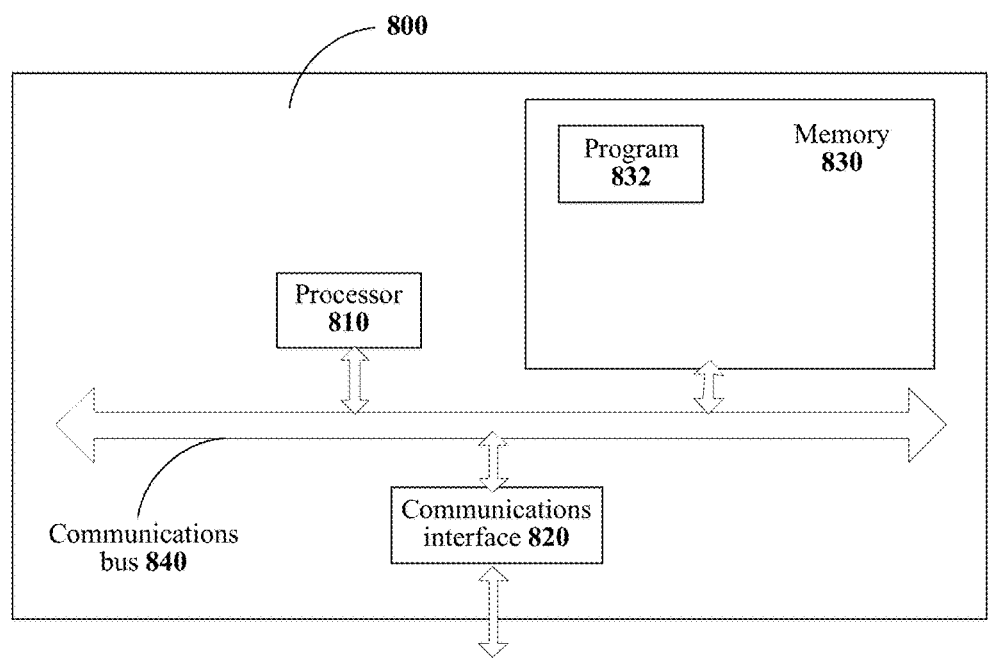
FIG. 8 is a schematic structural diagram of a third focusing apparatus provided by an embodiment of the present application.

FIG. 8 is a schematic structural diagram of a third imaging control apparatus (or called focusing apparatus) provided by an embodiment of the present application. The specific implementation manner of the imaging control apparatus 800 is not limited in specific embodiments of the present application. As shown in FIG. 8, the focusing apparatus 800 may include:

A processor 810, a communications interface 820, a memory 830, and a communications bus 840; where:

the processor 810, the communications interface 820 and the memory 830 implement mutual communication by the communications bus 840.

The communications interface 820 is configured to communicate with, for example, a deformable image sensor.

The processor 810 is configured to execute a program 832, specifically, to execute relative steps in any one of the foregoing method embodiments.

For example, the program 832 may include program code, where the program code includes computer operation instructions.

The processor 810 may be a Central Processing Unit (CPU), or an Application Specific Integrated Circuit (ASIC), or may be configured as one or more integrated circuits for implementing the embodiments of the present application.

The memory 830 is configured to store the program 832. The memory 830 may include a Random Access Memory (RAM), and may further include a non-volatile memory, for example, at least one magnetic disk storage.

For example, in an optional implementation manner, the processor 810 may implement the following steps by implementing the program 832: controlling deformation of an image sensor so that reference points of at least two imaging sub-areas of the image sensor after the deformation form a first relative position relationship in a staggered arrangement along a depth direction; acquiring contrast data of a sampling image of an object in the at least two imaging sub-areas; and determining and/or adjusting, at least according to the first relative position relationship and the contrast data, the focusing state of the image sensor.

In other optional implementation manners, the processor 810 may further implement the steps described in any one of the foregoing embodiments by executing the program 832, which is not described in detail herein.

For specific implementation of the steps in the program 832, reference may be made to the corresponding description in the corresponding steps, modules, sub-modules, and units in the foregoing embodiments, which is not described herein again. Persons skilled in the art may clearly understand that, for a convenient and concise description, the specific working process of the devices and the modules described above may refer to a corresponding process description in the foregoing method embodiments, which is not described herein again.

Figure 9:
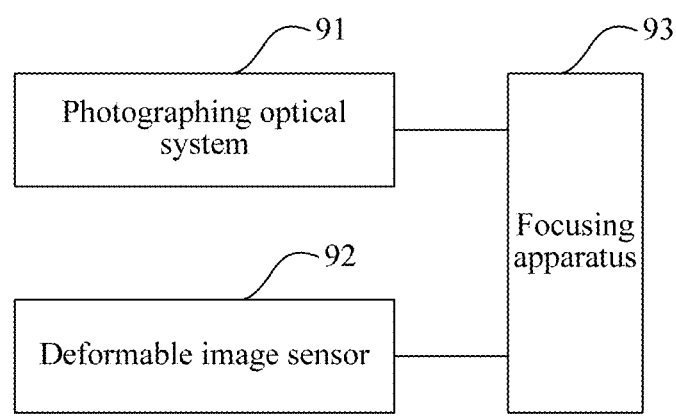
FIG. 9 is a logic block diagram of a photographing device provided by an embodiment of the present application.

FIG. 9 is a logic block diagram of a photographing device provided by the embodiment of the present application. As shown in FIG. 9, the photographing device provided by the embodiment of the present application includes: a photographing optical system 91, a deformable image sensor 92 and any one of the focusing apparatuses 93 provided by the embodiment of the present application.

A surface shape of the image sensor may be deformable, for example, may be the image sensor having at least a part of the surface shape of the imaging plane that may change, and a specific structure and a form of components of the image sensor are not limited. For example, the image sensor includes a flexible image sensor, and as shown in FIG. 1b, the flexible image sensor may be bent to some extent by an external force. And/or, for example, the image sensor includes the multiple imaging sub-areas in an array distribution, and the at least two imaging sub-areas are mutually linked by a deformable connection component, as shown in FIG. 1c, and the deformable connection component may include but is not limited to a flexible component or a controlled deformable material division, where the controlled deformable material division may include but is not limited to a photo deformable material division, a magnetic deformable material division, a piezoelectric material division, and the like.

The photographing optical system may include and is not limited to at least one imaging lens. The focusing state of the image sensor may be adjusted by changing one or more of the focusing parameters, such as a depth position of the lens, a distance between the lens and the image sensor, the depth position of the image sensor, and a focal distance of the lens, so that the depth position of the imaging plane of the image sensor approaches or coincides with the target in focus position as much as possible.

The structure, working mechanism, focusing method, technical effect that can be achieved and mechanism analysis of the focusing apparatus may all refer to the description in other parts of the present application, which is not described herein again.

In the various embodiments of the present application, the serial numbers and/or sequence numbers of the embodiments are merely for the convenience of description, and do not imply the preference among the embodiments. Particular emphasis is put on the description about each embodiment, and reference can be made to relevant description of other embodiments for the content not detailed in an embodiment. Reference can be made to the description about the corresponding method embodiments for related description about the implementation principle or process of relevant apparatus, device or system embodiments, which is not repeated herein.

A person of ordinary skill in the art may be aware that, units and method steps of the examples that are described in conjunction with the embodiments disclosed in this specification may be implemented by electronic hardware or a combination of computer software and electronic hardware. Whether the functions are performed by hardware or software depends on particular applications and design constraint conditions of the technical solution. A person skilled in the art may use different methods to implement the described functions for each particular application, but it should not be considered that the implementation goes beyond the scope of the present application.

When the functions are implemented in a form of a software functional unit and sold or used as an independent product, the functions may be stored in a computer-readable storage medium. Based on such an understanding, the technical solutions of the present application essentially, or the part contributing to the prior art, or a part of the technical solutions may be implemented in a form of a software product. The computer software product is stored in a storage medium and comprises several instructions for instructing a computer device (which may be a personal computer, a controller, a network device, or the like) to perform all or some of the steps of the methods described in the embodiments of the present application. The foregoing storage medium comprises: any medium that can store program code, such as a USB flash drive, a removable hard disk, a read-only memory (ROM), a random access memory (RAM), a magnetic disk, or an optical disc.

In the embodiments of the apparatus, method, and system of the present application, apparently, the parts (a system, a subsystem, a module, a sub-module, a unit, a subunit, and the like) or steps may be decomposed or combined, and/or decomposed first and then combined. These decomposition and/or combination should be considered as equivalent solutions of the present application. In the above descriptions of the specific embodiments of the present application, a feature described and/or shown for one implementation may be used in one or more of other implementations in the same or similar manner and combined with a feature in another implementation, or replace a feature in another implementation.

It should be emphasized that, terms "comprise/include" used herein refer to existence of a feature, an element, a step, or a component, but do not exclude existence or addition of one or more of other features, elements, steps, or components.

Finally, it should be noted that the foregoing implementation manners are merely used to describe the present application, but are not intended to limit the present application. A person of ordinary skill in the art may further make various variations and modifications without departing from the spirit and scope of the present application. Therefore, all the equivalent technical solutions also fall within the scope of the present application, and the patent protection scope of the present application should be subject to the claims.

What is claimed is:

1. A focusing method, comprising:
   controlling deformation of an image sensor so that reference points of at least two imaging sub-areas of the image sensor after the deformation form a first relative position relationship in a staggered arrangement along a depth direction;
   acquiring contrast data of a sampling image of an object in the at least two imaging sub-areas; and
   determining and/or adjusting, according to at least the first relative position relationship and the contrast data, a focusing state of the image sensor;
   wherein the determining and/or adjusting, according to at least the first relative position relationship and the contrast data, a focusing state of the image sensor comprises:
   determining, according to at least the first relative position relationship and the contrast data, second relative position information, which is in the depth direction, depth scopes that correspond to the at least two imaging areas relative to a target in focus depth position that corresponds to the object; and
   determining and/or adjusting, according to at least the second relative position information, the focusing state of the image sensor.

2. The method of claim 1, wherein the determining, according to at least the first relative position relationship and the contrast data, second relative position information in the depth direction of depth scopes that correspond to the at least two imaging areas relative to a target in focus depth position that corresponds to the object comprises:
   determining, in response to that the contrast data corresponding to the at least two imaging sub-areas presents a unidirectional change trend, that the target in focus depth position is out of the depth scopes corresponding to the at least two imaging sub-areas.

3. The method of claim 2, wherein the determining, in response to that the contrast data corresponding to the at least two imaging sub-areas presents a unidirectional change trend, that the target in focus depth position is out of the depth scopes corresponding to the at least two imaging sub-areas comprises:
   determining, in response to that the contrast data corresponding to the at least two imaging sub-areas presents a first unidirectional change trend matching the first relative position relationship, that the target in focus depth position is at a depth position behind the depth scopes corresponding to the at least two imaging sub-areas.

4. The method of claim 2, wherein the determining, in response to that the contrast data corresponding to the at least two imaging sub-areas presents a unidirectional change trend, that the target in focus depth position is out of the depth scopes corresponding to the at least two imaging sub-areas comprises:
   determining, in response to that the contrast data corresponding to the at least two imaging sub-areas presents a second unidirectional change trend opposite to the first relative position relationship, that the target in focus depth position is at a depth position in front of the depth scopes corresponding to the at least two imaging sub-areas.

5. The method of claim 1, wherein the determining, according to at least the first relative position relationship and the contrast data, second relative position information, which is in the depth direction, of depth scopes that correspond to the at least two imaging areas relative to a target in focus depth position that corresponds to the object comprises:

determining, in response to that the contrast data corresponding to the at least two imaging sub-areas presents a non-unidirectional change trend, that the target in focus depth position is between the depth scopes corresponding to the at least two imaging sub-areas.

6. The method of claim 1, wherein the adjusting, according to at least the second relative position information, the focusing state of the image sensor comprises:

adjusting, according to at least the second relative position information, focusing parameters of a photographing device comprising the image sensor so that an imaging plane position of the image sensor approaches or coincides with the target in focus depth position after the focusing parameters are adjusted.

7. The method of claim 1, wherein before the controlling deformation of the image sensor, the method further comprises:

determining a deformation degree of the image sensor, wherein maximum deformation along the depth direction of the at least two imaging sub-areas corresponding to an initial adjustment phase of an adjustment process of the focusing state is greater than the maximum deformation along the depth direction of the at least two imaging sub-areas corresponding to other phases of the adjustment process of the focusing state.

8. The method of claim 7, wherein from the initial adjustment phase of the adjustment process of the focusing state to a convergence phase, the maximum deformation along the depth direction of the at least two imaging sub-areas corresponding to the phases progressively decreases in sequence.

9. The method of claim 1, wherein before the controlling deformation of the image sensor, the method further comprises:

determining, according to a preview image of the object, a focus area; and determining, according the focus area, the at least two imaging sub-areas, wherein the at least two imaging sub-areas respectively correspond to at least two focus sub-areas comprised in the focus area.

10. The method of claim 9, wherein the determining, according to the focus area, the at least two imaging sub-areas comprises:

determining, according to content of the focus area, a quantity of the imaging sub-areas.

11. The method of claim 10, wherein the quantity of the imaging sub-areas corresponding to the focus area whose content has more details is greater than the quantity of the imaging sub-areas corresponding to the focus area whose content has fewer details.

12. A non-transitory computer readable storage apparatus, storing at least one executable instruction executable by a processor of a photographing device to cause the photographing device to perform operations comprising:

controlling deformation of an image sensor so that reference points of at least two imaging sub-areas of the image sensor after the deformation form a first relative position relationship in a staggered arrangement along a depth direction;

acquiring contrast data of a sampling image of an object in the at least two imaging sub-areas; and determining and/or adjusting, according to at least the first relative position relationship and the contrast data, a focusing state of the image sensor;

wherein the determining and/or adjusting, according to at least the first relative position relationship and the contrast data, a focusing state of the image sensor comprises:

determining, according to at least the first relative position relationship and the contrast data, second relative position information, which is in the depth direction, of depth scopes that correspond to the at least two imaging areas relative to a target in focus depth position that corresponds to the object; and determining and/or adjusting, according to at least the second relative position information, the focusing state of the image sensor.

13. The non-transitory computer readable storage apparatus of claim 12, wherein the determining, according to at least the first relative position relationship and the contrast data, second relative position information, which is in the depth direction, of depth scopes that correspond to the at least two imaging areas relative to a target in focus depth position that corresponds to the object comprises:

determining, in response to that the contrast data corresponding to the at least two imaging sub-areas presents a unidirectional change trend, that the target in focus depth position is out of the depth scopes corresponding to the at least two imaging sub-areas.

14. The non-transitory computer readable storage apparatus of claim 13, wherein the determining, in response to that the contrast data corresponding to the at least two imaging sub-areas presents a unidirectional change trend, that the target in focus depth position is out of the depth scopes corresponding to the at least two imaging sub-areas comprises:

determining, in response to that the contrast data corresponding to the at least two imaging sub-areas presents a first unidirectional change trend matching the first relative position relationship, that the target in focus depth position is at a depth position behind the depth scopes corresponding to the at least two imaging sub-areas.

15. The non-transitory computer readable storage apparatus of claim 13, wherein the determining, in response to that the contrast data corresponding to the at least two imaging sub-areas presents a unidirectional change trend, that the target in focus depth position is out of the depth scopes corresponding to the at least two imaging sub-areas comprises:

determining, in response to that the contrast data corresponding to the at least two imaging subareas presents a second unidirectional change trend opposite to the first relative position relationship, that the target in focus depth position is at a depth position in front of the depth scopes corresponding to the at least two imaging sub-areas.

16. The non-transitory computer readable storage apparatus according to claim 12, wherein the determining, according to at least the first relative position relationship and the contrast data, second relative position information, which is in the depth direction, of depth scopes that correspond to the at least two imaging areas relative to a target in focus depth position that corresponds to the object comprises:

determining, in response to that the contrast data corresponding to the at least two imaging sub-areas presents a non-unidirectional change trend, that the target in focus depth position is between the depth scopes corresponding to the at least two imaging subareas.

17. The non-transitory computer readable storage apparatus of claim 12, wherein the adjusting, according to at least the second relative position information, the focusing state of the image sensor comprises:
adjusting, according to at least the second relative position information, focusing parameters of a photographing device comprising the image sensor so that an imaging plane position of the image sensor approaches or coincides with the target in focus depth position after the focusing parameters are adjusted.

18. The non-transitory computer readable storage apparatus of claim 12, wherein the operations further comprises:
determining a deformation degree of the image sensor, wherein maximum deformation along the depth direction of the at least two imaging sub-areas corresponding to an initial adjustment phase of an adjustment process of the focusing state is greater than the maximum deformation along the depth direction of the at least two imaging sub-areas corresponding to other phases of the adjustment process of the focusing state.

19. The non-transitory computer readable storage apparatus of claim 18, wherein from the initial adjustment phase of the adjustment process of the focusing state to a convergence phase, the maximum deformation along the depth direction of the at least two imaging subareas corresponding to the phases progressively decreases in sequence.

20. The non-transitory computer readable storage apparatus of claim 12, wherein the operations further comprises:
determining, according to a preview image of the object, a focus area; and
determining, according the focus area, the at least two imaging sub-areas, wherein the at least two imaging sub-areas respectively correspond to at least two focus sub-areas comprised in the focus area.

21. The non-transitory computer readable storage apparatus of claim 20, wherein the determining, according the focus area, the at least two imaging sub-areas comprises:
determining, according content of the focus area, a quantity of the imaging sub-areas.

22. The non-transitory computer readable storage apparatus of claim 21, wherein the quantity of the imaging sub-areas corresponding to the focus area whose content has more details is greater than the quantity of the imaging sub-areas corresponding to the focus area whose content has fewer details.

23. A photographing device, comprising: a photographing optical system, a deformable image sensor, and the non-transitory computer readable storage apparatus according to claim 12.

24. The photographing device of claim 23, wherein the image sensor comprises a flexible image sensor.

25. The photographing device of claim 23, wherein the image sensor comprises multiple imaging sub-areas in an array distribution, and the at least two imaging sub-areas are connected by a deformable connection component.

26. A system, comprising:
a processor; and
a memory storing computer executable instructions, the processor being connected to the memory through a communication bus, and configured to execute the instructions to cause the system to perform:
controlling deformation of an image sensor so that reference points of at least two imaging sub-areas of the image sensor after the deformation form a first relative position relationship in a staggered arrangement along a depth direction;
acquiring contrast data of a sampling image of an object in the at least two imaging sub-areas; and
determining and/or adjusting, according to at least the first relative position relationship and the contrast data, a focusing state of the image sensor;
wherein the determining and/or adjusting, according to at least the first relative position relationship and the contrast data, a focusing state of the image sensor comprises:
determining, according to at least the first relative position relationship and the contrast data, second relative position information, which is in the depth direction, depth scopes that correspond to the at least two imaging areas relative to a target in focus depth position that corresponds to the object; and
determining and/or adjusting, according to at least the second relative position information, the focusing state of the image sensor.

* * * * *